(12) United States Patent
Tiberghien et al.

(10) Patent No.: US 9,080,712 B2
(45) Date of Patent: Jul. 14, 2015

(54) MALE AND FEMALE FLUIDIC COUPLING WITH FORCE REDUCING LOCKING AND UNLOCKING

(71) Applicant: Staubli Faverges, Faverges (FR)

(72) Inventors: Alain-Christophe Tiberghien, Sevrier (FR); Christophe Durieux, Gilly sur Isere (FR); Serafim Marques Barroca, Frontenex (FR)

(73) Assignee: STAUBLI FAVERGES, Faverges (FR)

( * ) Notice: Subject to any disclaimer, the term of this patent is extended or adjusted under 35 U.S.C. 154(b) by 0 days.

(21) Appl. No.: 14/085,115

(22) Filed: Nov. 20, 2013

(65) Prior Publication Data

US 2014/0174577 A1 Jun. 26, 2014

(30) Foreign Application Priority Data

Nov. 29, 2012 (FR) ...................... 12 61434

(51) Int. Cl.
| | |
|---|---|
| *F16L 37/28* | (2006.01) |
| *F16L 55/10* | (2006.01) |
| *F16L 37/30* | (2006.01) |
| *F16L 37/23* | (2006.01) |
| *F16L 37/34* | (2006.01) |
| *F16L 37/35* | (2006.01) |

(52) U.S. Cl.
CPC ................ *F16L 55/10* (2013.01); *F16L 37/23* (2013.01); *F16L 37/30* (2013.01); *F16L 37/34* (2013.01); *F16L 37/35* (2013.01)

(58) Field of Classification Search
USPC ....................... 137/614, 614.03–614.05, 798; 251/149.1, 149.6
See application file for complete search history.

(56) References Cited

U.S. PATENT DOCUMENTS

| | | | | |
|---|---|---|---|---|
| 6,659,130 | B2 * | 12/2003 | Arosio ...................... | 137/614.03 |
| 6,792,974 | B2 * | 9/2004 | Mikiya et al. ............ | 137/614.03 |
| 2009/0224534 | A1 | 9/2009 | Liu | |

FOREIGN PATENT DOCUMENTS

| | | |
|---|---|---|
| DE | 1078826 B | 3/1960 |
| DE | 2724630 A1 | 12/1978 |

* cited by examiner

Primary Examiner — Kevin Lee
(74) Attorney, Agent, or Firm — Dowell & Dowell, P.C.

(57) ABSTRACT

A fluidic connector including a connecting element and a mated connecting element wherein the connecting element includes a body defining a flow channel, a locking device for axially locking the body with a body of the mated element and a sealing ring that is displaced between a closed position, when the connector is in uncoupled configuration, and an open position wherein fluid can flow in the connector and wherein the sealing ring includes a housing that receives a coupling member which in a first position attaches the body of the connecting element with the sealing ring in the closed position, and which in a second position attaches the body of the mated connecting element with the sealing ring in the open position.

12 Claims, 5 Drawing Sheets

MALE AND FEMALE FLUIDIC COUPLING WITH FORCE REDUCING LOCKING AND UNLOCKING

BACKGROUND OF THE INVENTION

1. Field of the Invention

The invention relates to a connector comprised of a connecting element and of a mated connecting element able to be coupled. In particular, it can be considered that the connecting element is a male element and the mated connecting element is a female element with the understanding that the inverse can be considered.

2. Brief Discussion of the Related Art

By way of example, the invention has for application a fluidic connector for large passages of which the diameter is greater than 20 mm. A potential application is for example a filling connector for a coolant.

It is known that for connectors with large passages, as the seals have a large diameter, the forces due to the friction during the phases of coupling and uncoupling are substantial forces. Springs built into the connector are then sized to accompany the recalling of the parts subjected to these friction forces such as the relief valve in closed position. This results in that, during the coupling phase, the operator must exert substantial effort in order to, on the one hand, compensate the friction forces linked to the seals and, on the other hand, compress the springs.

Moreover, US-A-2009/0224534 discloses a connector for the passage of compressed air. This connector comprises a connecting element intended to be connected with a mated connecting element. The connecting element comprises a frame, a sleeve which is screwed inside the frame, a sealing ring which is arranged coaxially inside the sleeve and a piston. A body of the connecting element formed by the frame and the sleeve is defined. The sealing ring is provided with recesses for the passage of the compressed air. In uncoupled configuration, the sealing ring is in a closed-off position wherein the recesses are plugged by the sleeve so well that there is no passage of air in the connector. During the coupling, the sealing ring is displaced axially towards an open position wherein the air can flow in the recesses. In closed-off position, the sealing ring is coupled to the body of the connecting element by the intermediary of balls which are housed, on the one hand, in through-holes of the sealing ring and, on the other hand, in oblong holes of the sleeve. Around the sleeve is arranged a locking ring which is mobile around the body and subjected to an elastic load force in the direction of the front end of the connecting element. In closed-off position of the sealing ring, the locking ring maintains the balls for the axial attaching between the sleeve and the sealing ring. This ring is able to cover the balls and block them in cooperation with the mated connecting element, in order to axially attach the body of the mated connecting element with the sealing ring during coupling and uncoupling.

Blocking the coupling balls by the locking ring does not render reliable the axial attaching of the sealing ring with the body of the mated connecting element during coupling and uncoupling. For this reason, the connector uses a return spring for the sealing ring towards a closed-off configuration of the connector, which complicates the mounting of the connector and increases the coupling forces. This spring is arranged in the fluidic channel and its operation risks being altered by the pressure of the compressed air flowing in the connector.

SUMMARY OF THE INVENTION

It is this disadvantage that the invention intends more particularly to overcome by proposing a connector of which the connection is carried out more reliably and with less coupling forces and which remains simple.

For this purpose the invention relates to a fluidic connector, comprising a connecting element and a mated connecting element, able to be coupled together according to a coupling axis, with the connecting element comprising:
 a body delimiting a fluid flow channel in the connecting element,
 a locking device suited for axially locking a body of the connecting element with a body of the mated element when the connector is in coupled configuration, and
 a sealing ring, which, during the coupling and uncoupling of the connector, can be displaced in relation to the body of the connecting element between:
 a closed-off position of the flow channel of the body of the connecting element when the connector is in uncoupled configuration, and
 an open position wherein the fluid can flow in the connector.

This sealing ring comprising a housing for receiving a coupling member wherein the coupling member is mobile between:
 a first position, wherein the coupling member axially attaches the body of the connecting element with the sealing ring in closed-off position, and
 a second position, wherein the coupling member axially attaches the body of the mated connecting element with the sealing ring in open position,
 a blocking member which is suited for blocking the coupling member in its first position and for cooperating with the body of the mated connecting element, during coupling of the connector, in order to authorise the passage of the coupling member from said first to said second position. In accordance with the invention, during the coupling and uncoupling of the connector, the body of the connecting element is able to block the coupling member in said second position while the sealing ring is displaced, between the closed-off position and an open position wherein the locking device axially locks the body of the mated connecting element in relation to the body of the connecting element.

Thanks to the invention, in uncoupled configuration, the coupling member, blocked by the blocking member, makes it possible to maintain the sealing ring in this closed-off sealed position of the body of the connecting element. During the coupling and the uncoupling, the same coupling member, released from the covering of the blocking ring, makes it possible to couple the sealing ring to the body of the mated connecting element in order to axially attach their movements. The sealing ring therefore does not have to be pushed back elastically towards its closed-off position and the coupling forces are therefore reduced. The invention remains simple, in that the same coupling member cooperates axially with both the body of the connecting element and with the body of the mated connecting element. It is understood that the cooperation of the coupling member with the connecting element and that with the mated connecting element are two separate and successive operations. Indeed, in uncoupled configuration, the coupling member is able to axially attach the sealing ring with the body of the connecting element, then in a second step, during the coupling and the uncoupling, the coupling member, then disconnected from the body of the connecting element, makes it possible to couple the sealing ring to the body of the mated connecting element. Furthermore, the recalling of the sealing ring in closed-off position is not carried out using a central spring arranged in the fluidic channel. Finally, blocking the coupling member by the body of the connecting element in the second position further renders reliable the axial attaching between the sealing ring and the body of the mated connecting element.

According to advantageous but not mandatory aspects of the invention, a connector can incorporate one or several of the following characteristics taken in any technically permissible combination:

- The body of the connecting element comprises an internal piston and an external body portion, radially between which are arranged the sealing ring and the blocking member while the body of the mated connecting element is set in place around the sealing ring during the coupling and uncoupling of the connector.
- The body of the mated connecting element has an internal hollow housing that receives the coupling member when the coupling member is in its second position, and an external hollow housing that receives a locking member of the locking device when the connector is coupled.
- In coupled configuration of the connector, the sealing diameter of the sealing ring with the body of the mated connecting element is strictly less than the sealing diameter of the sealing ring with the body of the connecting element.
- In uncoupled configuration of the connector, the sealing diameter of the piston with the sealing ring, in its portion located at a front end of the connecting element, intended to be turned towards the mated connecting element during the coupling, is strictly less than the sealing diameter of the piston with the sealing ring in its portion that provides the seal to the rear of the piston.
- The connecting element further comprises a spring which is arranged axially, between the sealing ring and the blocking member and which calls back the blocking member towards its blocking position of the coupling member in its first position when the connector is uncoupled.
- The coupling member comprises at least one radially mobile coupling ball in the sealing ring while the blocking member is a blocking ring able to radially cover the coupling ball in said first position wherein the coupling ball cooperates axially with a housing of the body of the connecting element.
- The front end of the body of the mated connecting element has an inner diameter that is strictly less than the inner diameter of an internal surface of the blocking ring, covering the coupling ball when the connector is in its uncoupled configuration.
- The connecting element comprises a memory element suited for blocking the locking device in unlocked position when the connector is in uncoupled configuration, and for cooperating with the body of the mated connecting element during the coupling of the connector in order to authorise the passage of the locking device into locked position.
- The memory element is a memory ring which is recalled by a spring towards a radial covering position of a locking member belonging to the locking device wherein the memory ring blocks the locking device in unlocked position when the connector is uncoupled.
- The blocking member and the memory element are the same ring while, in uncoupled configuration of the connector, the internal surface of the ring radially covers the coupling member in said first position and the external surface of the ring radially covers the locking member in its unlocked position.
- The memory ring is suited for, during the coupling of the connector, uncovering respectively and successively, the coupling member and the locking member.

BRIEF DESCRIPTION OF THE DRAWINGS

The invention shall be better understood and other advantages of the latter shall appear more clearly when reading the following description of an embodiment of a connector in accordance with its principle, provided solely by way of example and made in reference to the annexed drawings wherein.

DESCRIPTION OF THE PREFERRED EMBODIMENTS

In the embodiment described hereinbelow, the arrival of the fluid can be carried out indifferently on the male element side or on the female element side.

Figure 1:
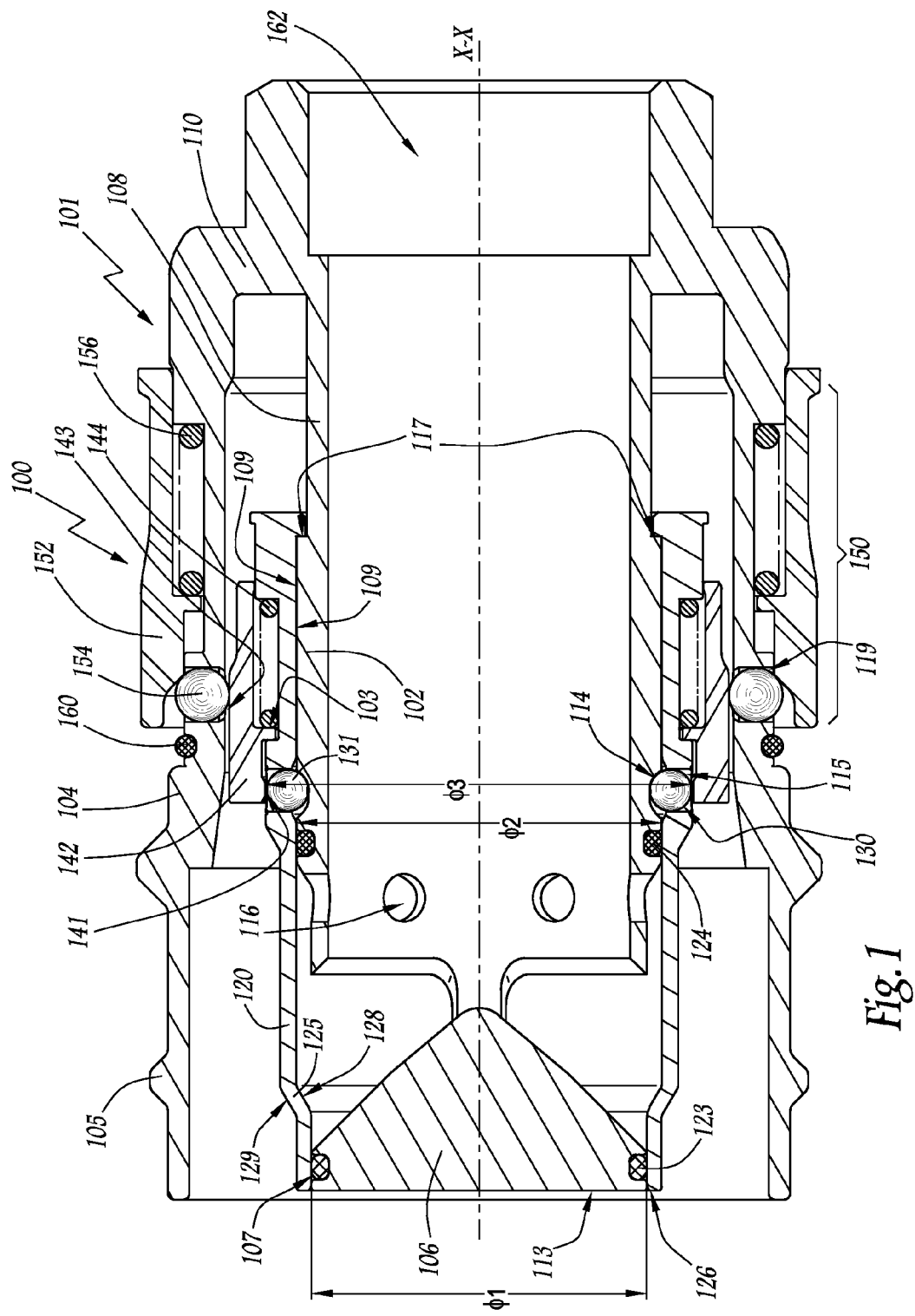
FIG. 1 is a longitudinal cross-section of a male element belonging to a connector in accordance with the invention.

The male element 100 shown in uncoupled state in FIG. 1 has a generally tubular structure centred on an axis X-X. In the rest of the description, a radial direction or all that is characterised radially refers to a direction perpendicular to the axis X-X. The body 101 of this male element 100 comprises a piston 102 and a structure 104 which respectively constitute the internal and external portions of the body 101 of the male element 100. The piston 102 comprises a generally tapered portion 106 and a generally cylindrical portion 108, both substantially centred on the axis X-X. The tapered portion 106 of the piston 102 is located in front of the male element 100, i.e. turned, during coupling, towards a mated element of the connector to which the male element 100 belongs. The tapered portion 106 and the cylindrical portion 108 of the piston 102 form a single unit. The cylindrical portion 108 delimits an internal fluid flow channel 162 in the connecting element 100 and has in its front end portion, i.e. in contact with the tapered portion 106, openings 207 wherein the fluid can flow when the connector is coupled. The tapered portion 106 has an external radial surface 107 while the cylindrical portion 108 of the piston 102 has an external radial surface 109, comprising a peripheral hollow housing 114. The body 101 of the male element 100 is formed from a single unit, with the piston 102 and the external structure 104 being connected by a rear end portion 110 of the body 101, with the flow channel 162 being connected to a line not shown on the rear end portion 110. The external structure 104 therefore extends from this rear end portion 110 to the front end portion of the body 101, at the same axial level from which is substantially located the tapered portion 106 of the piston 102.

A sealing ring 120 of generally tubular shape is arranged radially between the piston 102 and the external portion 104. A first seal 123, housed on the external radial surface 107 is arranged radially between the sealing ring 120 and the tapered portion 106 of the piston 102 and a second seal 124, housed on the external radial surface 109, to the front of the hollow peripheral housing 114, is arranged radially between cylindrical portion 108 of the piston 102 and the sealing ring 120, which provides a sealed covering of the piston 102 on openings 207 by the sealing ring 120 in uncoupled configuration and therefore the closing off of the flow channel 162 and of the line connected to the connecting element 100.

A shoulder 125 is defined, giving rise to a shrinking of the diameter of the sealing ring towards the front. A first planar surface 126 of the sealing ring 120 is noted as the front axial end. In the same way, a second planar surface 113 is noted as the front axial end of the piston 102. The shoulder 125 also has an internal surface 128 and an external surface 129.

The sealing ring 120 has, in its portion substantially located at the same axial level as the seal 123 an inner diameter $\Phi 1$ and, in its portion substantially located at the same axial level as the seal 124, an inner diameter $\Phi 2$. $\Phi 1$ and $\Phi 2$ are the sealing diameters of the sealing ring 120 with the piston 102 in uncoupled configuration. $\Phi 1$ is strictly less than $\Phi 2$ for example of a magnitude of 0.15 mm: this has for advantage, in the presence of a fluid under pressure inside the sealing ring, to thrust the sealing ring 120 towards the front abutting against a shoulder 117 of the piston 102. Indeed, the pressure of the fluid on the internal surface of the sealing ring 120, in particular on the surface 128 of the shoulder 125 tends to maintain the closing off of the male element 100.

The cylindrical portion 108 of the piston 102 further comprises radial through-holes 116 distributed around the axis X-X and arranged axially to the front in relation to the seal 124 and to the rear in relation to the openings 207 on a portion of the piston 102 of which the outer diameter is less than the diameter $\Phi 2$. The pair of planar surfaces 126 and 113 are planar surfaces which flush with each other. This makes it possible to astutely limit the fluid residue.

The sealing ring 120 is mobile according to the axis X-X in relation to the piston 102 during the coupling and the uncoupling and bears a coupling member 130. This coupling member 130 is mobile radially in relation to the sealing ring and comprises, and is even composed of coupling balls 131. Here, in this example, twelve coupling balls are housed and mobile radially in respective cylindrical housings 115 arranged in the sealing ring 120 around the axis X-X and, in the uncoupled configuration, are partially arranged in the hollow housing 114 of the cylindrical portion 108 of the piston 102.

A memory ring 142 is arranged radially between the sealing ring 120 and the external portion 104 of the male body 101. A spring 144 is inserted between the sealing ring 120 and the memory ring 142 according to the axis X-X and pushes back the memory ring 142 towards the front of the connecting element 100 and abutting against a shoulder 103 of the sealing ring 120. In uncoupled configuration, the memory ring 120, then abutting against the shoulder 103, radially covers the coupling balls 131 housed in both the cylindrical housings 115 and in the hollow housing 114, wherein they are blocked, in axial cooperation with the piston 102, in order to couple the body 101 and the sealing ring 120, in other words, axially attach, after allowing for clearance, the body 101 and the sealing ring 120. The coupling of the body 101 with the sealing ring 120 provides the sealed covering of the piston 102 by the sealing ring 120.

The male element 100 further comprises a locking device 150. This locking device 150 comprises a locking ring 152, arranged exteriorly to the external structure 104 of the body 101 of the connecting element 100 and locking balls 154, which are housed in a radially mobile manner in cylindrical housings 119 of the external structure 104 of the body 101, as well as a lock spring 156 which is inserted axially between the external portion 104 of the body 101 and the locking ring 152 in order to axially push back the locking ring 152 towards the front of the connecting element 100, in radial covering position of the locking balls 154. In uncoupled configuration, the locking balls 154 are arranged radially between the memory ring 142 and the locking ring 152. The memory ring 142 cooperates with the locking balls 154 which radially exceed towards the exterior of the external structure 104, as such pushing back the locking ring 152 in rear position against the lock spring 156, and therefore blocking the locking device 150 in unlocked position. With the memory ring 142 pushed back by the spring 144 in uncoupled configuration of the connector, the internal radial surface 141 of the memory ring 142, which has a diameter $\Phi 3$, covers the coupling balls 131 while the external radial surface 143 of the memory ring 142 covers the locking balls 154. A protective ring 105 is defined as a front end portion of the external structure 104 of the male element 100. This protective ring 105 therefore makes it possible advantageously to protect the external surface of the sealing ring 120 in the event of an impact and limits accessibility to the memory ring 142.

A visual indicator 160 is also positioned exteriorly on the external structure 104 of the body 101 of the male element 100 and is uncovered by the locking ring 152 in uncoupled configuration.

Figure 2:
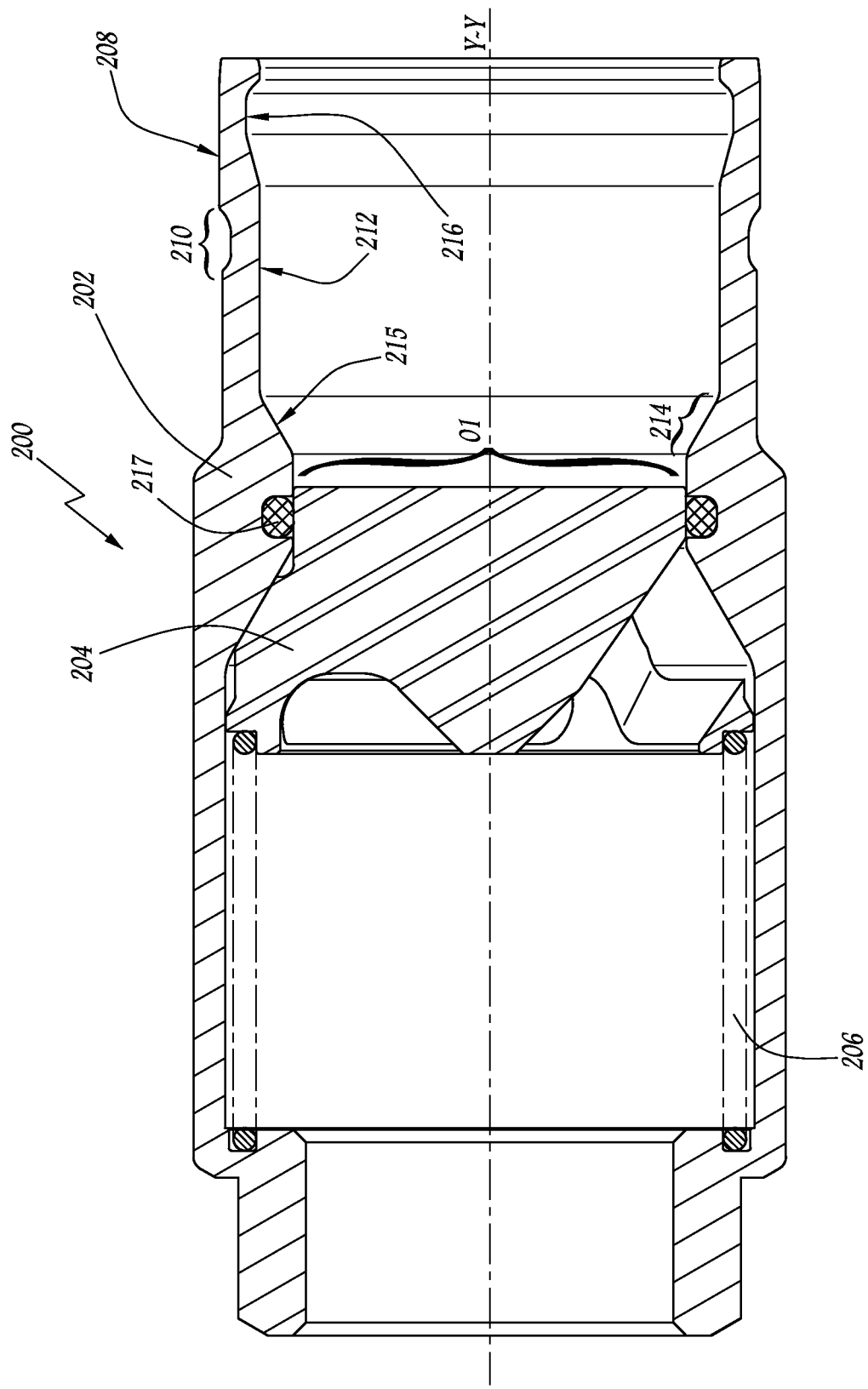
FIG. 2 is a longitudinal cross-section of a female element belonging to the connector in accordance with the invention.

In FIG. 2 is shown a mated connecting element 200, which in the example under consideration, is a female element, in the uncoupled configuration. This female element 200 has a generally tubular shape around an axis Y-Y and comprises an external portion 202 which constitutes the body of the female element and a relief valve 204. The external portion 202 is connected to a line not shown. In the uncoupled configuration of the connector, the relief valve 204 closes off an opening O1. A spring 206 bears against the relief valve 204 and on the body 202 of the female element, parallel to the Y axis-Y and pushes back the relief valve 204 towards the front of the body 202 in closed position against the body 202.

Moreover, the body 202 of the female element 200 has on its external surface 208 a peripheral hollow housing 210 and, on its internal surface 212, a shoulder 214 having an internal surface 215 and widening towards the front, as well as a peripheral hollow housing 216, arranged axially to the front in relation to the housing 210 and to the shoulder 214. The front end of the body 202 of the female element, i.e. turned towards the male element 100 during coupling has a minimum inner diameter $\Phi 6$, arranged to the front of the hollow housing 216. A seal 217 is housed in the body 202 on the opening O1, and arranged radially between the relief valve 204 and the body of the female element 202.

Figure 3:
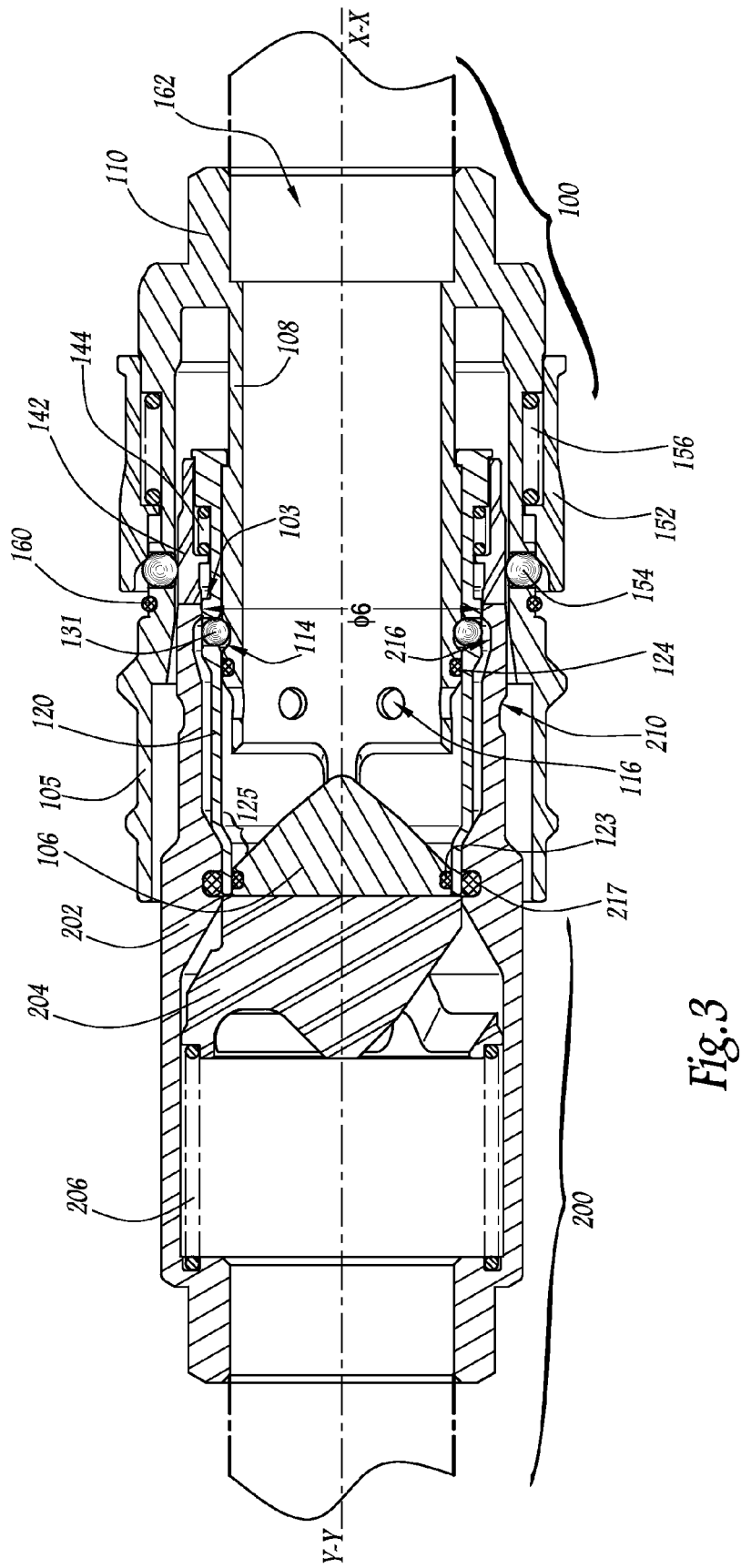
FIGS. 3 to 5 are longitudinal cross-sections of the connector, showing three separate and successive coupling configurations.

FIG. 3 shows an intermediate position of the coupling between the male element 100 and the female element 200, with the axes X-X and Y-Y then being confounded by forming a coupling axis. The body 202 of the female element 200 is brought around the sealing ring 120 and comes into contact axially with the memory ring 142, pushing it back as such towards the rear of the body 101 against the spring 144. The coupling force implemented directly acts against the axial forces linked to the elastic force of the spring 206 of the relief valve 204, to the friction force of the seal 217 of the relief valve 204 and to the elastic force of the memory spring 144. The memory ring 142, in cooperation with the body 202, is then shifted axially in relation to the coupling balls 131 and stops blocking them in the hollow housing 114. The body 202 of the female element 200 then comes into contact with the sealing ring 120 via abutment between the internal surface 215 of the shoulder 214 of the body 202 of the female element 200 and the external surface 129 of the shoulder 125 of the sealing ring 120. The seal is then operational between the sealing ring 120 and the female body 202 by the intermediary of the seal 217, in the same way as between the sealing ring 120 and the piston 102 by the intermediary of the seal 124. On the other hand, the piston 102 pushing back the relief valve 204 towards the rear of the body 202 against the spring of the relief valve 206, the relief valve 204 therefore moves away from the male element. Simultaneously, the hollow housing 216 radially reaches a position facing coupling balls 131 and the progression of the female element 200 in the direction of coupling places in axial translation, towards the rear of the connecting element 100, the sealing ring 120.

Figure 4:
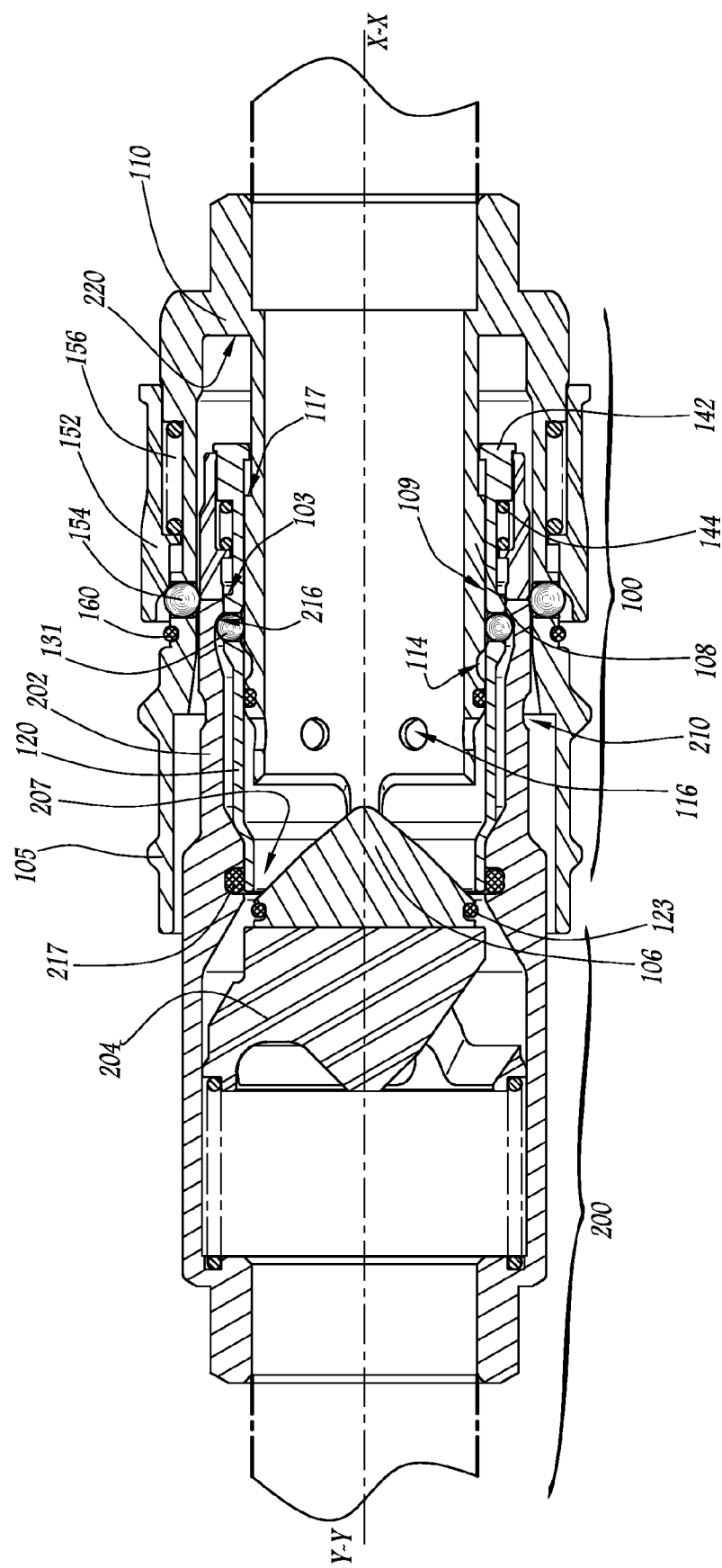

The coupling balls 131 being released from the covering of the memory ring 142, and being located in front of the housings 216, progress with the sealing ring 120 towards the rear of the connecting element 100 and are radially flushed from the internal housing 114 of the external surface of the piston 102 to the hollow housing 216 of the female body 202, as such passing the connector in the configuration of FIG. 4, wherein the coupling balls 131 are partially engaged in the hollow housing 216 and the seal is broken between the sealing ring 120 and the piston 102, more particularly on the seal 123. The sealing ring 120 is located in an open position wherein the fluid can flow in the connector between the two elements of the connector.

Advantageously, the spring 144 is inserted between the sealing ring 120 and the memory ring 142, so well that as soon as the sealing ring 120 is pushed back by the body 202 of the female element 200, the operator no longer has to fight the elastic force of the spring 144 in order to continue with the coupling. The operator must however fight the friction forces of the seals 123, 124 and the elastic force of the spring 206, then, as soon as the fluid flows in the connector, only the friction of the seal 124 as well as the elastic force of the spring 206.

The coupling member 130 making it possible to couple the piston 102 and the sealing ring 120 in uncoupled configuration successively fulfils another function which is the axial attaching of the sealing ring 120 with the body of the female element 202, after allowing for clearance, when the latter is displaced in relation to the body 101, this with each coupling ball 131, housed in a housing 115, which is located respectively in a first position engaged in the housing 114 of the piston 102 then passes in a second position engaged in the housing 216 of the body of the female element 202. In particular, as can be easily seen in FIG. 4, the external surface 109 of the piston 102, to the rear of the housing 114, radially covers the coupling balls 131 in the cylindrical housings 115, engaged in the housing 216. The coupling balls 131 are then blocked in axial cooperation with the body 202 axially attaching the sealing ring 120 and the body 202.

Note that at the beginning of the movement of the sealing ring 120 under the action of the body 202 during coupling, the coupling balls 131 axially attach the sealing ring 120 and the body 202 although the seal is still operational on seal 123.

Figure 5:
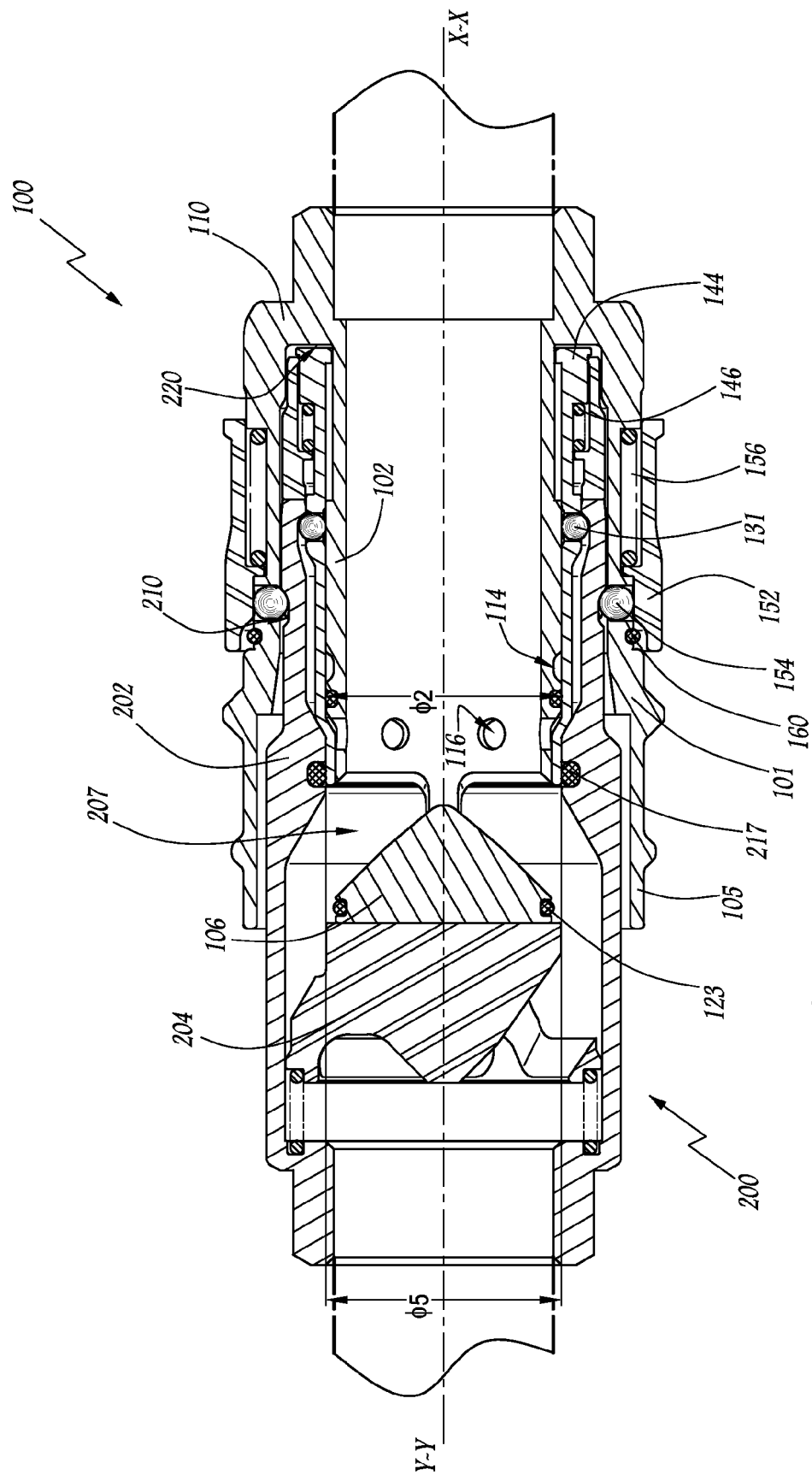

From the intermediate configuration of FIG. 4, the continuation of the coupling of the female element 200 with the male element 100 consists in that the body 202 of the female element 200 continues to drive in its movement of translation the sealing ring 120 and the memory ring 142 until the sealing ring 120 reaches an end-of-travel abutment 220 which represents the zone of contact between the rear end of the sealing ring 120 and the body 101 of the male element 100, the connector then being substantially in the configuration of FIG. 5. The memory ring 142, pushed back by the body 202, is then offset axially in relation to the locking balls 154 and no longer acts on the locking balls 154. During this movement, the operator fights only the friction forces linked to the seal 124, which makes it that the forces supplied by the operator are more substantial at the beginning of the coupling than at the end of the coupling. Moreover, the female body 202, by axially pushing back the memory ring 142, is inserted between the locking balls 154 and the sealing ring 120.

The housing 210 located on the external surface 212 of the female element 200 is positioned radially facing locking balls 154. The locking balls 154 are then pushed back by the locking ring 152, in locked position in the housing 210 provided for this purpose. The locking ring 152, driven by the lock spring 156, covers then exteriorly the locking balls 154 in locked position: the body 101 is axially locked with the body 202 and the connector is coupled.

In coupled configuration of the connector, the coupling balls 131 are still blocked by the external radial surface 109 in their second position of axial attaching of the sealing ring 120 with the body 202. The body 101 of the connecting element 100 therefore makes it possible to block the coupling balls in their second position while the sealing ring 120 is displaced between the closed-off position and the open position.

The visual indicator 160 is then no longer visible, as it is covered by the locking ring 152 as FIG. 5 shows in coupled configuration. This visual indicator 160 therefore makes it possible to indicate whether or not the system is locked. The memory ring 142 is therefore used, during the coupling, to uncover successively in this order the coupling balls 131 as well as the locking balls 154.

It is therefore understood that, in terms of an alternative not shown, the memory ring 142 can be replaced with two separate parts that respectively assume the function of blocking in liaison with the coupling member 130 and the function of memory in liaison with the locking device 150. As such, using the same part to provide the functions of blocking and of memory makes it possible to obtain a more compact connector.

The coupling of the sealing ring 120 with the female body 202 by the coupling balls 131 makes it possible to open the circuit in complete safety before the locking of the connector. Indeed, in the case where the coupling were to be interrupted before the locking of the connector, by the removal of the element 200 outside of the male element 100, the circuit would again be sealed off without the risk of a leak since the removal of the female body 202 would integrally result in the withdrawal of the sealing ring 120. This occurs until the sealing ring becomes uncoupled from the female body 202 and is maintained axially with the piston 102, thus providing a sealed covering of the latter.

The memory ring 142, acting on the locking balls 154, makes it possible to guarantee an automatic coupling, in other words under the sole action of connecting the body 202 into the connecting element 100, without the locking ring 152 moving backwards and with minimised axial coupling forces.

In order to reach the configuration described in FIG. 5, the sealing ring 120 comes, in the continuation of its movement, to cover the cylindrical portion 108 of the piston 102. The sealing ring 120 is then able to drive, in its movement, fluid remaining imprisoned between the internal surface of the sealing ring, on the internal surface 128, and the external radial surface of the cylindrical portion 108 of the piston 102, by covering at the front of the seal 124. The radial through-holes 116 then make it possible to remove this possible fluid residue towards the inside of the piston 102.

In coupled configuration, the sealing ring 120 guarantees the seal of the connection of the two connecting elements 100 and 200 by cooperating with the seal 217 and the seal 124. The sealing diameter Φ5 of the sealing ring 120 with the body 202 on seal 217, corresponding to the outer diameter of the sealing ring 120 in contact with the seal 217, is strictly less than the sealing diameter Φ2 of the sealing ring 120 with the body 101, on seal 124, corresponding to the inner diameter of the sealing ring in contact with the seal 124, with the differential being of a magnitude of 0.15 mm. As such, the force of the fluid in circulation tends to push back the sealing ring 120 towards the front of the connecting element 100, in contact against the body 202, so well that the coupling balls 131 are not subjected to forces linked to the pressure of the fluid.

During the uncoupling, the operator is invited to unlock the connector in a first step, by pulling towards the rear on the locking ring 154, as such allowing the visual lock indicator 160 to appear and allowing a radial clearance space towards the exterior for the locking balls 154. During this operation, the user compresses the lock spring 156 intended to call back the locking ring by covering locking balls 154. By removing the body 202 of the female element 200 of the male element 100, the user radially pushes back towards the exterior the locking balls 154 which exit the housing 210 and drives, by means of the coupling balls 131 maintained in the housing 216 of the internal surface 212 of the body 202 of the female element 200, the sealing ring 120. The memory ring 142, driven integrally from the sealing ring 120 and pushed back by the spring 144, is inserted under the locking balls 154, blocking the locking device 150 in unlocked position. Then, the coupling balls 131 radially reach the hollow housing 114 of the cylindrical portion 108 of the piston 102 with the sealing ring 120 abutting against the shoulder 117 of the piston 102. The coupling balls 131 then stop axially attaching the sealing ring 120 and the body 202 of the female element 200 while the sealing ring 120 has covered in a sealed manner the piston 102 and as such has interrupted the flow of the fluid.

The memory ring 142, pushed back par the spring 144 then intelligently covers the coupling balls 131 in the housing 114 in order to maintain the sealing ring 120 in closed-off position of the flow channel 162. For this, the spring 144 is just sized to push back the memory into the covering position of the coupling balls 131 and of the locking balls 154. As such, as this spring 144 is not sized according to the friction induced by the seals 123, 124 and 217 under pressure, the elastic force of this spring 144 is therefore substantially less than the friction forces of the seals 123, 124 and 217.

Moreover, the inner diameter Φ6 of the body 202 of the female element 200 is provided strictly less than the inner diameter Φ3 of the memory ring 142. As such, the memory ring 140 has a radial clearance with the cylindrical housings 115 of the coupling balls 131 that is greater than the radial clearance of which the front end of the body 202 of the female element 200 has with the cylindrical housings 115. This makes it possible, advantageously, to facilitate the displacements of the memory ring 142, under the sole elastic force of the spring 144, by limiting its friction when the internal surface of minimum diameter Φ6 is shifted in relation to the coupling balls 131 during the uncoupling and that the internal surface of diameter Φ3 comes to radial cover of the coupling balls 131.

Note that during the uncoupling, the memory ring 142 has already covered the locking balls 154 when it has to cover the coupling balls 131 in the hollow housing 114. This uncoupling makes it possible to minimise the elastic force of the spring 144.

The coupling of the sealing ring 120 with the female body 202 by the coupling balls 131 all along the displacement of the sealing ring 120 in relation to the body 101 as well as the coupling of the sealing ring 120 with the body 101 in uncoupled configuration make it possible to suppress the elastic recalling of the sealing ring 120 in closed-off position in relation to the body 101 and therefore to reduce the connection forces, in relation to the connector of the state of the art.

Other embodiments of the invention can be considered such as replacing the locking balls with one or several locking claws maintained by a locking ring. This embodiment also authorises the construction of a single ring acting both on the coupling member and on the locking device.

A connector can also be considered that has a system for locking of the bayonet type, in this case, the locking of the connector does not require a ring acting on locking members.

The invention claimed is:

1. A fluidic connector, comprising a connecting element and a mated connecting element, which are coupled together along a coupling axis, with the connecting element comprising:
   a body having a fluid flow channel in the connecting element,
   a locking device for axially locking the body of the connecting element with a body of the mated element when the connector is in a coupled configuration, and
   a sealing ring, which, during coupling and uncoupling of the connecting element and the mated connecting element of the connector, is movable in relation to the body of the connecting element between:
   a closed-off position of the flow channel of the body of the connecting element when the connecting element and the mated connecting element of the connector are in an uncoupled configuration, and
   an open position wherein the fluid flows in the connector,
   the sealing ring including a housing for receiving a coupling member wherein the coupling member is movable between:
   a first position, wherein the coupling member axially attaches the body of the connecting element with the sealing ring in the closed-off position, and
   a second position, wherein the coupling member axially attaches the body of the mated connecting element with the sealing ring in the open position,
   a blocking member for blocking the coupling member in the first position and for cooperating with the body of the mated connecting element, during the coupling of the connecting element and the mated connecting element of the connector, in order to allow passage of the coupling member from the first to the second position,
the connector being characterised in that, during the coupling and uncoupling of the connecting element and the mated connecting element of the connector, the body of the connecting element blocks the coupling member in the second position while the sealing ring is displaced, between the closed-off position and the open position wherein the locking device axially locks the body of the mated connecting element in relation to the body of the connecting element.

2. The connector according to claim 1, wherein the body of the connecting element includes an internal piston and an external body portion, radially between which are arranged the sealing ring and the blocking member, and wherein the body of the mated connecting element is set in place around the sealing ring during the coupling and uncoupling of the connecting element and the mated connecting element of the connector.

3. The connector according to claim 2, wherein the body of the connecting element has an internal hollow housing that receives the coupling member when the coupling member is in the second position, and an external hollow housing that receives a locking member of the locking device when the connecting element and the mated connecting element of the connector is coupled.

4. The connector according to claim 3, wherein, in the coupled configuration of the connector, the sealing diameter of the sealing ring with the body of the mated connecting element is less than the sealing diameter of the sealing ring with the body of the connecting element.

5. The connector according to claim 2, wherein, in the uncoupled configuration of the connector, the sealing diameter of the piston with the sealing ring, in a portion located at a front end of the connecting element, intended to be turned towards the mated connecting element during the coupling, is strictly less than the sealing diameter of the piston with the sealing ring in a portion providing a seal to a rear of the piston.

6. The connector according to claim 1, wherein the connecting element includes a spring arranged axially, between the sealing ring and the blocking member and which spring urges the blocking member towards the blocking position of the coupling member in the first position, when the connecting element and the mated connecting element of the connector are uncoupled.

7. The connector according to claim 1, wherein the coupling member includes at least one coupling ball radially movable in the sealing ring and wherein the blocking member is a blocking ring that radially covers the coupling ball in the first position wherein the coupling ball cooperates axially with a housing of the body of the connecting element.

8. The connector according to claim 7, wherein a front end of the body of the mated connecting element has an inner diameter that is less than an inner diameter of an internal surface of the blocking ring, covering the coupling ball when the connecting element and the mated connecting element of the connector are in the uncoupled configuration.

9. The connector according to claim 1, wherein the connecting element includes a memory element suited for blocking the locking device in unlocked position when the connecting element and the mated connecting element of the connector are in the uncoupled configuration, and for cooperating with the body of the mated connecting element during coupling of the connector in order to allow passage of locking device to the locked position.

10. The connector according to claim 9, wherein the memory element is a memory ring which is urged by a spring towards a radial covering position of a locking member belonging to the locking device wherein the memory ring blocks the locking device in an unlocked position, when the connecting element and the mated connecting element of the connector are uncoupled.

11. The connector according to claim 9, wherein the blocking member and the memory element are parts of the ring and, in the uncoupled configuration of the connecting element and the mated connecting element of the connector, an internal surface of the ring radially covers the coupling member in the first position and the external surface of the ring radially covers the locking member in the unlocked position.

12. The connector according to claim 10, wherein the memory ring is, during the coupling of the connecting element and the mated connecting element of the connector, respectively and successively uncovers, the coupling member and the locking member.

* * * * *